W. C. CLIFTON.
Cultivator.
No. 108,239.
Patented Oct. 11, 1870.
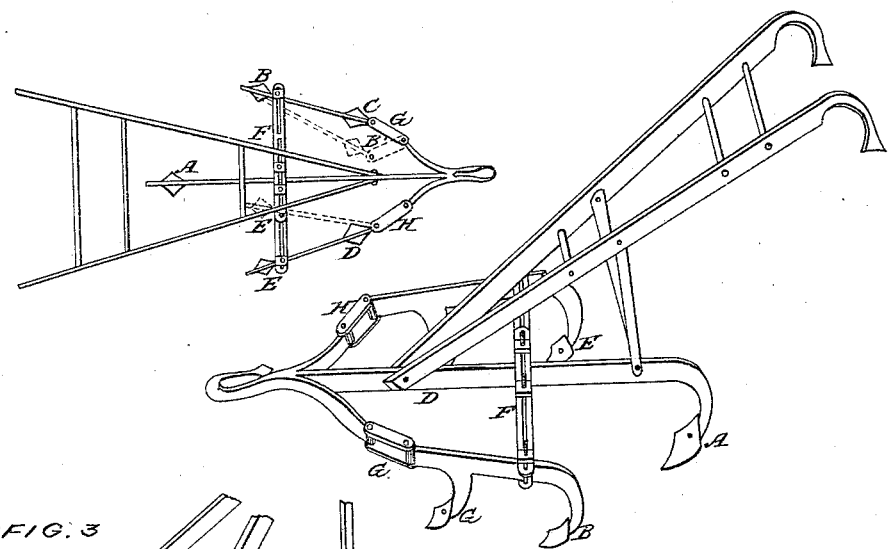
WITNESSES:
INVENTOR:

United States Patent Office.

WILLIAM C. CLIFTON, OF ELK RIVER TOWNSHIP, IOWA.

Letters Patent No. 108,239, dated October 11, 1870.

IMPROVEMENT IN CORN-PLOWS.

The Schedule referred to in these Letters Patent and making part of the same.

I, WILLIAM C. CLIFTON, of Elk River township, in Clinton county, State of Iowa, have invented certain Improvements in Corn-Plows, of which the following is a description.

Nature and Object of the Invention.

My invention relates to the construction and arrangement of five shovels in a corn-plow, adjusting them, as may be desired, by means of a double cross-bar, slotted, and a clevis joint, the shovels gathering the earth toward the corn or taking it from, as may be desired.

Description of the Accompanying Drawing.

Figure 1 is a top view.
Figure 2 is a perspective view.
Figure 3 is a perspective view of the cross-bars.
The same letters refer to same parts in the different figures.
A is the tiller-shovel.
B, C, D, and E, the side shovels.
F, the cross-bars.
G and H the clevis-joints.

General Description.

I make the machine all of iron, save the handles, and, for ordinary cultivation, I adjust the shovels as indicated in the drawing, figs. 1 and 2.

When it is desired to throw earth toward the corn, loosen the nuts on the cross-bars F, and move the shovel at E over, sliding the bars F together; the angle of the shovel at D, caused by moving the bars to which it is attached, as indicated by the dotted lines D E' in fig. 1, will turn the earth toward the corn; and, if it is desired to draw the earth away from the corn, adjust the bars F and shovels, as at B C, and shown by the dotted lines B B', and the shovel B, by the angle thus formed, will move the earth away as desired.

In all cases, the adjustable bars F, by means of the clamp-hooks and nuts passing around the bars holding the shovels, must be firmly secured, to hold the parts in place.

The shovel A acts as a tiller, and, being located in the rear, keeps the plow from wabbling about. The adjustable bars F being in two parts, to slide over each other, the length is thereby shortened, and the plow run very near the corn without the bar coming in contact with the corn and injuring it.

Claim.

I claim as my invention—

The particular arrangement of the five shovels A, B, C, D, and E in an iron corn-plow, located as described, with the adjustable slotted bar F, when constructed and arranged substantially as and for the purpose above set forth.

In testimony whereof, I have hereunto set my hand and affixed my name this day of June, A. D. 1870.

W. C. CLIFTON.

Witnesses:
C. W. MAGILL,
WM. W. SANBORN.